United States Patent
Matsumoto et al.

(10) Patent No.: US 9,900,389 B2
(45) Date of Patent: Feb. 20, 2018

(54) INFORMATION PROCESSING APPARATUS AND EXECUTION MANAGEMENT PROGRAM

(71) Applicant: Clarion Co., Ltd., Saitama-shi, Saitama (JP)

(72) Inventors: Takashi Matsumoto, Tokyo (JP); Atushi Shimizu, Tokyo (JP); Wataru Nakasone, Tokyo (JP); Toshihiro Mochizuki, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 198 days.

(21) Appl. No.: 14/951,780

(22) Filed: Nov. 25, 2015

(65) Prior Publication Data

US 2016/0156717 A1 Jun. 2, 2016

(30) Foreign Application Priority Data

Nov. 27, 2014 (JP) .................. 2014-240109

(51) Int. Cl.
*G06F 15/173* (2006.01)
*H04L 29/08* (2006.01)
(Continued)

(52) U.S. Cl.
CPC .............. *H04L 67/14* (2013.01); *B60K 35/00* (2013.01); *G06F 9/485* (2013.01); *H04B 1/3822* (2013.01);
(Continued)

(58) Field of Classification Search
CPC ................. H04L 67/14; H04W 4/027
(Continued)

(56) References Cited

U.S. PATENT DOCUMENTS

2006/0082437 A1* 4/2006 Yuhara .................... B60R 25/04 340/5.82
2015/0039877 A1* 2/2015 Hall ........................ G06F 1/32 713/2

(Continued)

FOREIGN PATENT DOCUMENTS

| EP | 2 924 392 A1 | 9/2015 |
|---|---|---|
| JP | 2003-222523 A | 8/2003 |

(Continued)

OTHER PUBLICATIONS

European Search Report issued in counterpart European Application No. 15195871.7 dated May 2, 2016 (9 pages).

*Primary Examiner* — Hamza Algibhah
(74) *Attorney, Agent, or Firm* — Crowell & Moring LLP

(57) ABSTRACT

Provided is an information processing apparatus including: a content execution unit configured to execute a content; a content type storage unit configured to store each type of the content in association with information for determining whether or not to allow finish of the execution during a travel of a vehicle; a memory monitoring unit configured to identify a remaining memory capacity available for the content execution unit; a travel state monitoring unit configured to acquire a state of the vehicle; and a finish content determination unit configured to use, when the remaining memory capacity is less than a predetermined threshold, the content type storage unit to determine a content for which execution is allowed to be finished depending on the state of the vehicle acquired by the travel state monitoring unit, and issue a finish request for the content to the content execution unit.

8 Claims, 17 Drawing Sheets

435 CONTENT TYPE DB

| CONTENT TYPE (435a) | ALLOWED/NOT ALLOWED TO BE FINISHED DURING TRAVEL (435b) |
|---|---|
| NAVIGATION COOPERATION | NOT ALLOWED |
| AUDIO | NOT ALLOWED |
| VIDEO | ALLOWED |
| SPEECH RECOGNITION | NOT ALLOWED |
| TELEPHONE CALL | NOT ALLOWED |
| SMARTPHONE COOPERATION | ALLOWED |
| SOCIAL | ALLOWED |
| VEHICLE COOPERATION | NOT ALLOWED |
| OTHER | ALLOWED |

(51) Int. Cl.
　　　*H04B 1/3822*　　　(2015.01)
　　　*H04W 4/02*　　　(2018.01)
　　　*G06F 9/48*　　　(2006.01)
　　　*B60K 35/00*　　　(2006.01)

(52) U.S. Cl.
　　　CPC .......... *H04L 67/327* (2013.01); *H04W 4/027* (2013.01); *B60K 2350/906* (2013.01)

(58) Field of Classification Search
　　　USPC ....................................................... 709/226
　　　See application file for complete search history.

(56) References Cited

U.S. PATENT DOCUMENTS

| 2015/0061895 | A1* | 3/2015 | Ricci | H04W 4/22 |
| | | | | 340/902 |
| 2015/0254960 | A1* | 9/2015 | Nike | H04M 1/6075 |
| | | | | 340/441 |
| 2015/0298548 | A1 | 10/2015 | Maru et al. | |

FOREIGN PATENT DOCUMENTS

| JP | 2013-152627 A | 8/2013 |
| WO | WO 2014/080952 A1 | 5/2014 |

* cited by examiner

FIG. 3

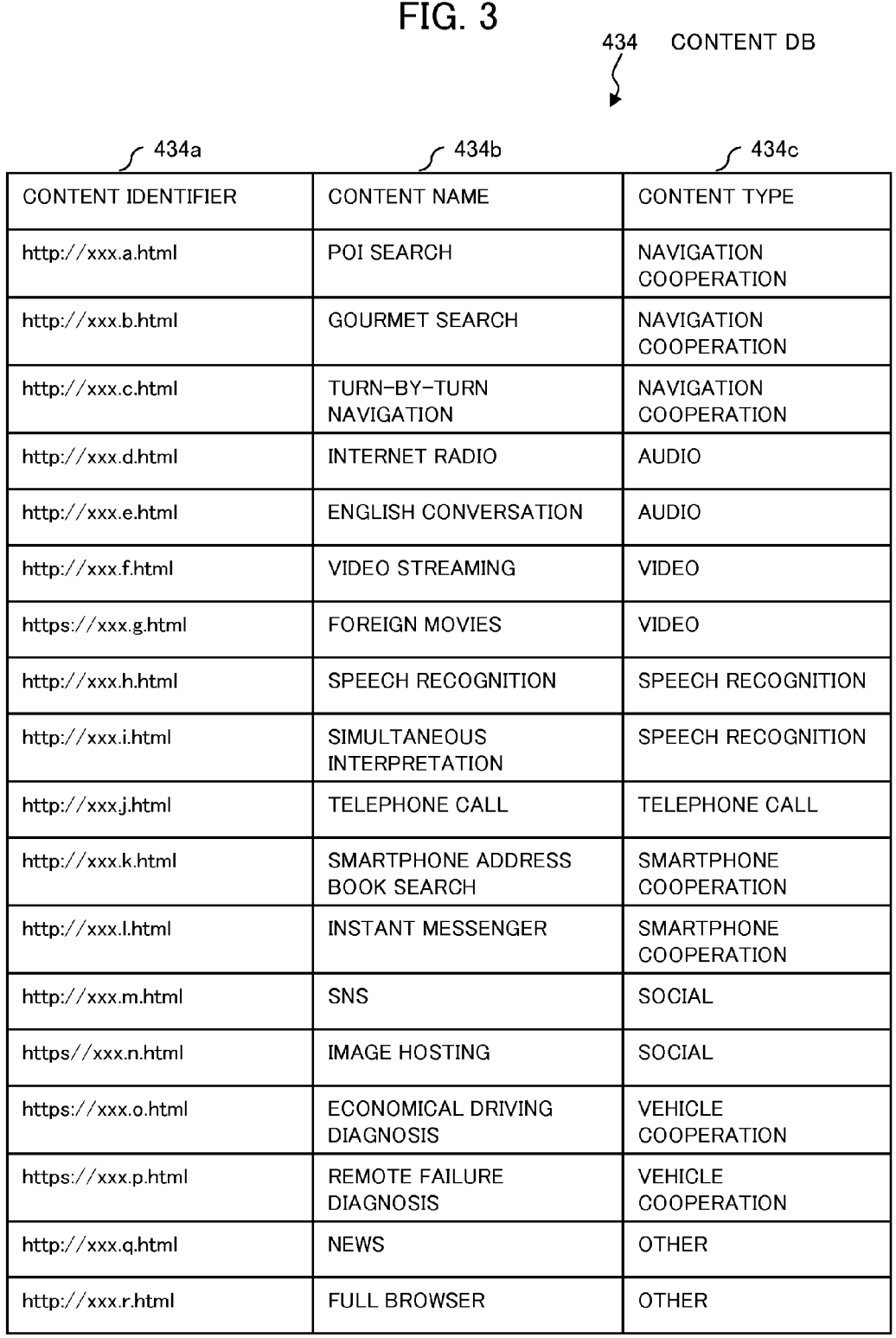

434 CONTENT DB

| CONTENT IDENTIFIER | CONTENT NAME | CONTENT TYPE |
|---|---|---|
| http://xxx.a.html | POI SEARCH | NAVIGATION COOPERATION |
| http://xxx.b.html | GOURMET SEARCH | NAVIGATION COOPERATION |
| http://xxx.c.html | TURN-BY-TURN NAVIGATION | NAVIGATION COOPERATION |
| http://xxx.d.html | INTERNET RADIO | AUDIO |
| http://xxx.e.html | ENGLISH CONVERSATION | AUDIO |
| http://xxx.f.html | VIDEO STREAMING | VIDEO |
| https://xxx.g.html | FOREIGN MOVIES | VIDEO |
| http://xxx.h.html | SPEECH RECOGNITION | SPEECH RECOGNITION |
| http://xxx.i.html | SIMULTANEOUS INTERPRETATION | SPEECH RECOGNITION |
| http://xxx.j.html | TELEPHONE CALL | TELEPHONE CALL |
| http://xxx.k.html | SMARTPHONE ADDRESS BOOK SEARCH | SMARTPHONE COOPERATION |
| http://xxx.l.html | INSTANT MESSENGER | SMARTPHONE COOPERATION |
| http://xxx.m.html | SNS | SOCIAL |
| https//xxx.n.html | IMAGE HOSTING | SOCIAL |
| https://xxx.o.html | ECONOMICAL DRIVING DIAGNOSIS | VEHICLE COOPERATION |
| https://xxx.p.html | REMOTE FAILURE DIAGNOSIS | VEHICLE COOPERATION |
| http://xxx.q.html | NEWS | OTHER |
| http://xxx.r.html | FULL BROWSER | OTHER |

435  CONTENT TYPE DB

| 435a CONTENT TYPE | 435b ALLOWED/NOT ALLOWED TO BE FINISHED DURING TRAVEL |
|---|---|
| NAVIGATION COOPERATION | NOT ALLOWED |
| AUDIO | NOT ALLOWED |
| VIDEO | ALLOWED |
| SPEECH RECOGNITION | NOT ALLOWED |
| TELEPHONE CALL | NOT ALLOWED |
| SMARTPHONE COOPERATION | ALLOWED |
| SOCIAL | ALLOWED |
| VEHICLE COOPERATION | NOT ALLOWED |
| OTHER | ALLOWED |

FIG. 11

435' CONTENT TYPE DB

| CONTENT TYPE | ALLOWED/NOT ALLOWED TO BE FINISHED DURING TRAVEL | PRIORITY |
|---|---|---|
| NAVIGATION COOPERATION | NOT ALLOWED | 2 |
| AUDIO | ALLOWED | 11 |
| VIDEO | ALLOWED | 13 |
| SPEECH RECOGNITION | NOT ALLOWED | 4 |
| TELEPHONE CALL | NOT ALLOWED | 3 |
| SMARTPHONE COOPERATION | ALLOWED | 12 |
| SOCIAL | ALLOWED | 14 |
| VEHICLE COOPERATION | NOT ALLOWED | 1 |
| OTHER | ALLOWED | 99 |

FIG. 13

434' CONTENT DB

| CONTENT IDENTIFIER (434a) | CONTENT NAME (434b) | CONTENT TYPE (434c) | RESIDENCE NECESSITY (434d) |
|---|---|---|---|
| http://xxx.a.html | POI SEARCH | NAVIGATION COOPERATION | NOT NECESSARY |
| http://xxx.b.html | GOURMET SEARCH | NAVIGATION COOPERATION | NOT NECESSARY |
| http://xxx.c.html | TURN-BY-TURN NAVIGATION | NAVIGATION COOPERATION | NOT NECESSARY |
| http://xxx.d.html | INTERNET RADIO | AUDIO | NECESSARY |
| http://xxx.e.html | ENGLISH CONVERSATION | AUDIO | NOT NECESSARY |
| http://xxx.f.html | VIDEO STREAMING | VIDEO | NOT NECESSARY |
| https://xxx.g.html | FOREIGN MOVIES | VIDEO | NOT NECESSARY |
| http://xxx.h.html | SPEECH RECOGNITION | SPEECH RECOGNITION | NECESSARY |
| http://xxx.i.html | SIMULTANEOUS INTERPRETATION | SPEECH RECOGNITION | NOT NECESSARY |
| http://xxx.j.html | TELEPHONE CALL | TELEPHONE CALL | NECESSARY |
| http://xxx.k.html | SMARTPHONE ADDRESS BOOK SEARCH | SMARTPHONE COOPERATION | NOT NECESSARY |
| http://xxx.l.html | INSTANT MESSENGER | SMARTPHONE COOPERATION | NOT NECESSARY |
| http://xxx.m.html | SNS | SOCIAL | NOT NECESSARY |
| https//xxx.n.html | IMAGE HOSTING | SOCIAL | NOT NECESSARY |
| https://xxx.o.html | ECONOMICAL DRIVING DIAGNOSIS | VEHICLE COOPERATION | NOT NECESSARY |
| https://xxx.p.html | REMOTE FAILURE DIAGNOSIS | VEHICLE COOPERATION | NECESSARY |
| http://xxx.q.html | NEWS | OTHER | NOT NECESSARY |
| http://xxx.r.html | FULL BROWSER | OTHER | NOT NECESSARY |

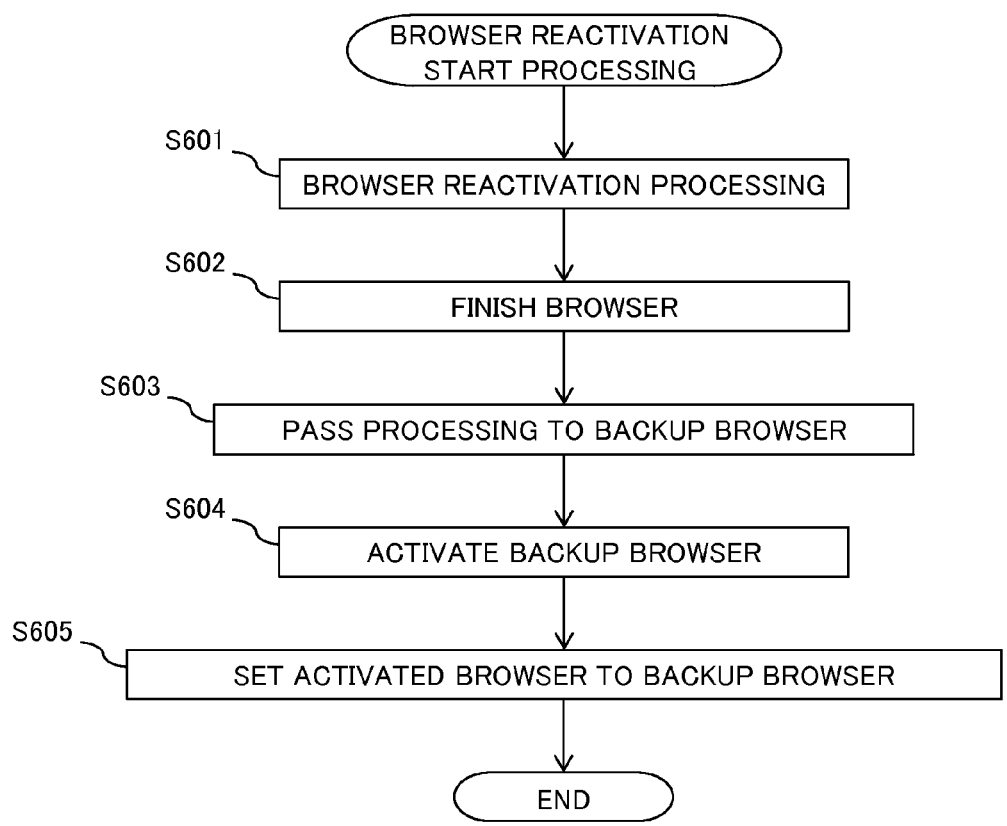

INFORMATION PROCESSING APPARATUS AND EXECUTION MANAGEMENT PROGRAM

BACKGROUND OF THE INVENTION

The present invention relates to a technology for an information processing apparatus and an execution management program. The present invention claims priority to Japanese Patent Application No. 2014-240109 filed on Nov. 27, 2014, the contents of which are incorporated herein by reference in its entirety for the designated states where incorporation by reference of literature is allowed.

As the related art in this technical field, there is a technology disclosed in Japanese Patent Laid-open Publication No. 2013-152627. Japanese Patent Laid-open Publication No. 2013-152627 includes a description, "an on-vehicle terminal having installed thereon an application execution environment for operating an application, in which the application execution environment includes activation means for activating the application after the application execution environment is activated, and for reactivating the application at a predetermined timing, and notification means for giving, when the application is activated by the activation means, a notification whether or not this activation is a first activation carried out after the activation of the application execution environment".

SUMMARY OF THE INVENTION

In the above-mentioned technology, when the application is activated, whether or not the activation is for the first time is notified, but an optimal content to be finished cannot fundamentally be determined and finished depending on time-varying states of a vehicle and an on-vehicle terminal.

The present invention has been made in view of the above-mentioned problem, and therefore has an object to determine an optimal content to be finished depending on states of a vehicle and an in-vehicle terminal.

The present application includes a plurality of measures for solving at least a part of the problem, and a description is now given of examples thereof. According to one embodiment of the present invention, in order to solve the above-mentioned problem, there is provided an information processing apparatus, including: a content execution unit configured to execute a content; a content type storage unit configured to store each type of the content in association with information for determining whether or not to allow finish of the execution during a travel of a vehicle; a memory monitoring unit configured to identify a remaining memory capacity available for the content execution unit; a travel state monitoring unit configured to acquire a state of the vehicle; and a finish content determination unit configured to use, when the remaining memory capacity is less than a predetermined threshold, the content type storage unit to determine a content for which execution is allowed to be finished depending on the state of the vehicle acquired by the travel state monitoring unit, and issue a finish request for the content to the content execution unit.

According to the one embodiment of the present invention, an optimal content to be finished depending on the states of the vehicle and the in-vehicle terminal may be determined. Problems, configurations, and effects that have not been described become apparent from the following description of embodiments.

BRIEF DESCRIPTION OF THE DRAWINGS

FIG. 3 is a diagram for showing a data structure of a content DB.

FIG. 11 is a diagram for showing a data structure of a content type DB according to a fourth embodiment of the present invention.

FIG. 13 is a diagram for showing a data structure of a content DB according to a fifth embodiment of the present invention.

FIG. 17 is a flowchart for illustrating a flow of browser reactivation processing according to the seventh embodiment.

DESCRIPTION OF THE PREFERRED EMBODIMENTS

Figure 1:
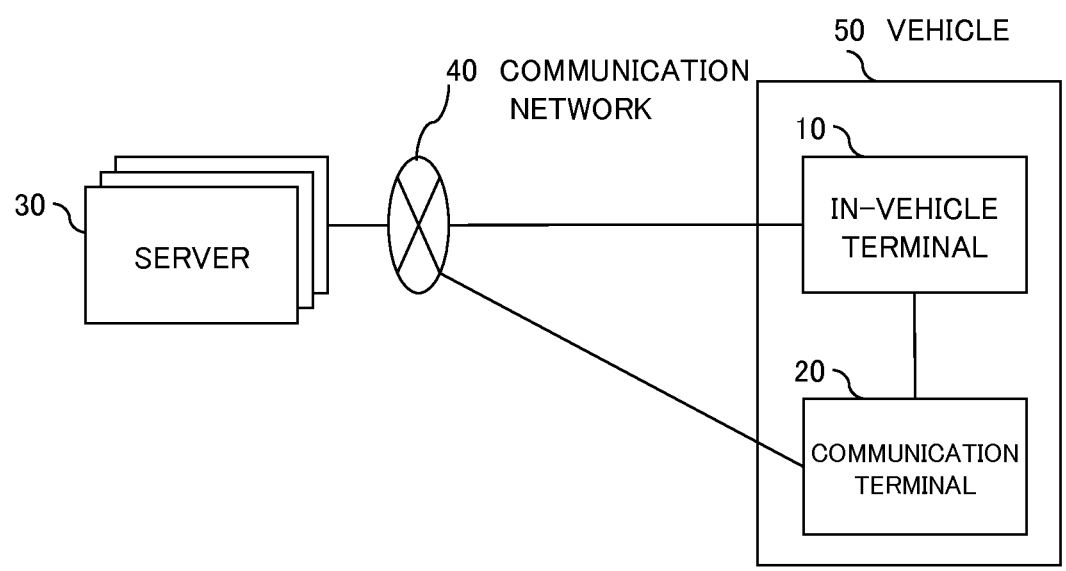
FIG. 1 is a diagram for illustrating a configuration example of an information processing system according to an embodiment of the present invention.

Referring to the drawings, a description is now given of an example of an information processing apparatus to which embodiments of the present invention are applied.

In general, in many cases, an in-vehicle terminal makes an access to a web site via communication in a content execution environment such as a browser, and the content is executed in the content execution environment. For example, this type of content is often provided in order to provide a responsive search function to a user, and to provide information for realizing a finely tuned change in a display depending on a state of the user. This is because a processing performance of mobile devices such as smartphones has drastically increased, and, as a result, more complex processing can be carried out on the client apparatus side. On the other hand, even on an embedded type device that does not have sufficient hardware resources in general, a demand for similar use of such contents is increasing, and necessity of efficiently controlling the hardware resources is thus further increasing.

In Particular, in a navigation apparatus and the like, which are installed on a moving body such as a vehicle and have come to be partially responsible for vehicle control in addition to providing a route guidance and various kinds of information, contents that maybe finished and contents that should not be finished are relative depending on states of the vehicle and in-vehicle terminal in use, and dynamically change depending on situations. For example, in a state in which the vehicle is traveling, contents that are prohibited from being used during the travel can naturally be finished, but contents that are allowed to be used during the travel should not be finished. Moreover, as another example, when a frequency modulation (FM) radio is used on the in-vehicle terminal side, an Internet radio playback content, which operates on a browser and is not used in this situation, can be determined to be finished.

FIG. 1 is a diagram for illustrating an example of a configuration of an information processing system including an in-vehicle terminal 10, which is an information processing apparatus to which an embodiment of the present invention is applied. This information processing system is an information processing system capable of providing, via a communication network 40, various contents to occupants of a vehicle 50, and includes the in-vehicle terminal 10, a communication terminal 20, a server 30, the communication network 40, and the vehicle 50. Note that, the contents include programs such as application software, videos, images, websites, music, and various other types of information such as entertainment information, vehicle control information, and information used for business. Moreover, the contents may be information that is not provided via the communication network 40, but is stored in a storage apparatus managed by the in-vehicle terminal 10.

The in-vehicle terminal 10 is installed on the vehicle 50 in a fixed or detachable manner. Note that, the in-vehicle terminal 10 may be installed not only on the vehicle 50 but also on other moving bodies. Moreover, the in-vehicle terminal 10 is not necessarily installed on a moving body, and only needs to communicate to/from other apparatuses such as the server 30 via a wired or wireless network.

The in-vehicle terminal 10 according to this embodiment connects to the server 30 via the communication network 40, to thereby acquire contents to be provided to the occupants of the vehicle 50. The in-vehicle terminal 10 may directly connect to the communication network 40, or may connect to the communication network 40 via the communication terminal 20. For the communication between the in-vehicle terminal 10 and the communication terminal 20, a communication function available for a connection between terminals such as the universal serial bus (USB), the Bluetooth (trademark), or a wireless local area network (LAN) is used.

The communication terminal 20 provides the in-vehicle terminal 10 with a function of allowing the in-vehicle terminal 10 to communicate to/from other apparatuses on the communication network 40. Moreover, the communication terminal 20 can serve as an alternative to the function of the server 30 by storing the contents to be executed on the in-vehicle terminal 10. In this case, the communication terminal 20 is connected to the in-vehicle terminal 10 as one of the plurality of servers 30.

The server 30 is an information processing apparatus including the contents to be provided and executed on the in-vehicle terminal 10. The server 30 communicates to/from any one of or both of the in-vehicle terminal 10 and the communication terminal 20 via the communication network 40. Note that, the number of the servers 30 is not limited to one, and the server 30 may be constructed by a plurality of information processing apparatuses.

The communication network 40 is a network through which computers can mutually communicate to/from each other such as a telephone network, the Internet, and a public local area network (LAN).

The vehicle 50 is a moving body configured to acquire a drive force by consuming a fuel, electricity, or both the fuel and the electricity, and moves while carrying the in-vehicle terminal 10, the communication terminal 20, and the occupants.

Figure 2:
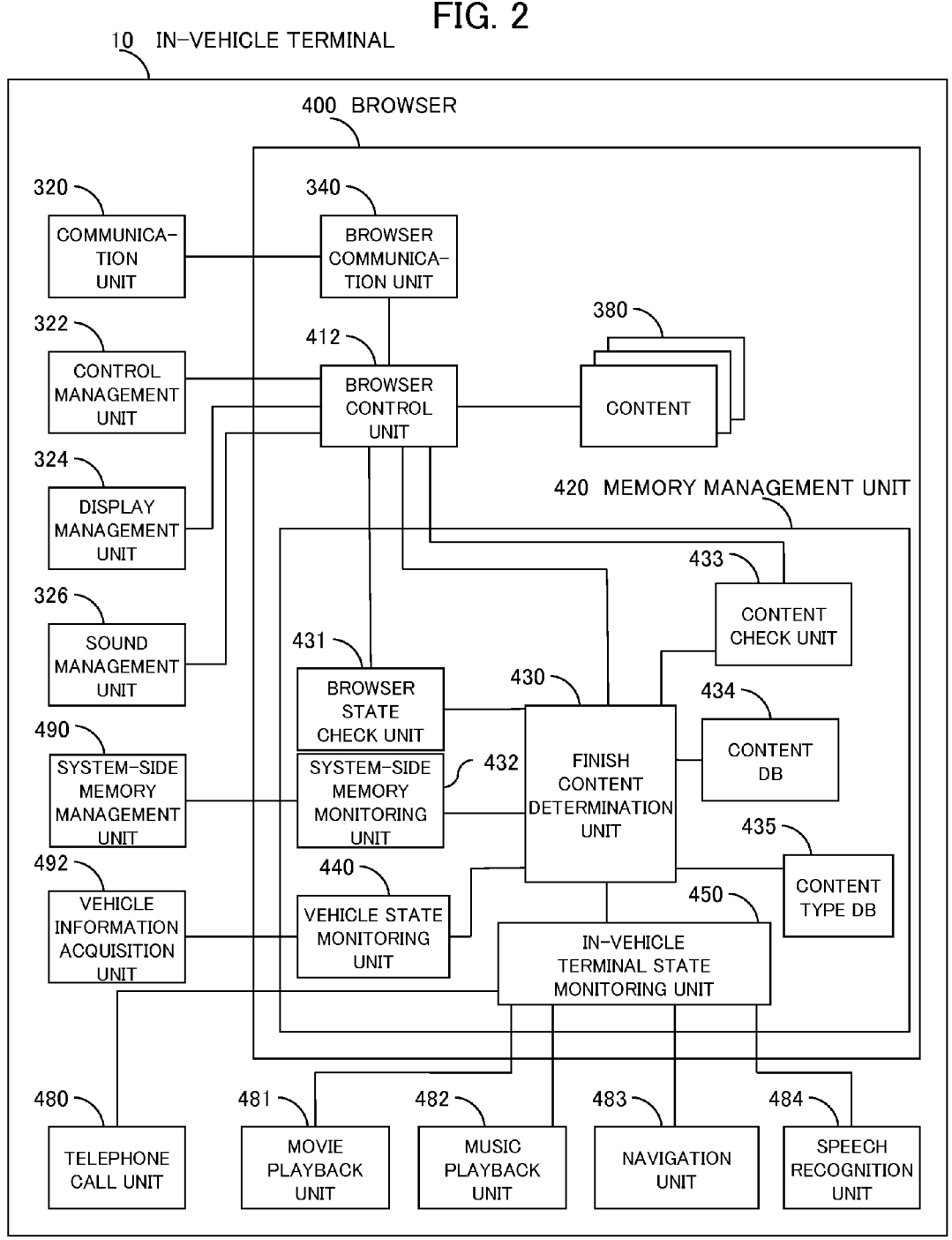
FIG. 2 is a diagram for illustrating a configuration example of an in-vehicle terminal.

FIG. 2 is a diagram for illustrating a configuration example of the in-vehicle terminal 10. The in-vehicle terminal 10 includes a communication unit 320, an control management unit 322, a display management unit 324, a sound management unit 326, a browser 400, a telephone call unit 480, a movie playback unit 481, a music playback unit 482, a navigation unit 483, a speech recognition unit 484, a system-side memory management unit 490, and a vehicle information acquisition unit 492.

The communication unit 320 communicates to/from the communication terminal 20, communicates to/from a computer on the communication network 40 via the communication terminal 20, and realizes data communication between the in-vehicle terminal 10 and the server 30. Besides, the communication unit 320 itself may provide a function of communicating to/from other computers on the communication network 40 and making and receiving a telephone call.

The control management unit 322 is a function of receiving an operation by the user, and passing the operation to processing parts such as the contents and the browser 400.

The display management unit 324 selectively displays image data such as a screen generated by an operating system (OS) and programs depending on an internal state of the in-vehicle terminal 10. Moreover, the display management unit 324 manages whether the browser 400 on the in-vehicle terminal 10 is in such a state that the browser 400 can be viewed by the occupants (hereinafter referred to as "foreground state") or is in such a state that other functions are displayed and the browser 400 cannot be viewed (hereinafter referred to as "background state").

The sound management unit 326 selectively transmits output data relating to a sound output by a program executed on the in-vehicle terminal 10 to a speaker depending on the internal state of the in-vehicle terminal 10. Moreover, the sound management unit 326 selectively transmits input data received from a microphone to a program depending on the internal state of the in-vehicle terminal 10.

The telephone call unit 480 connects to the communication terminal 20 or the communication unit 320, to thereby make and receive a telephone call and process the telephone call.

The movie playback unit 481 acquires movie data from an apparatus for outputting movie information such as a television tuner and an optical disc drive, and plays back the movie data as a movie.

The music playback unit 482 acquires music data from a radio tuner, an auxiliary storage apparatus, an optical disk drive, a memory card interface (IF), and the communication terminal 20, and plays back the music data as a music piece.

The navigation unit 483 uses data acquired from map data stored in the auxiliary storage apparatus, a positioning sensor, a gyro sensor, a vehicle signal line, an on-vehicle network, and the like, to thereby provide a car navigation function.

The speech recognition unit 484 converts the speech data input from a sound input apparatus such as the microphone into character data, and recognizes an uttered content of the input speech data.

The system-side memory management unit 490 manages a memory amount used on the OS and an available remaining memory capacity on the OS, a memory usage, which is a memory capacity being used by processes of programs operating on the OS, and the like.

The vehicle information acquisition unit 492 is a function of supplying output data of the on-vehicle network acquired from the vehicle signal line or the on-vehicle network IF to the respective programs such as the navigation unit 483.

The browser 400 includes a browser communication unit 340, a browser control unit 412, contents 380, the execution of which is controlled by the browser control unit 412, and a memory management unit 420. The browser 400 corresponds to a content execution unit configured to execute the contents.

The browser communication unit 340 communicates to/from the server 30 and the communication terminal 20. The browser communication unit 340 acquires the content 380 provided by the server 30 and the like, and transmits a processing result relating to the content 380 to an external apparatus such as the server 30. When a response to the transmitted result exists, the browser communication unit 340 receives information on the result from the external apparatus, and displays the response.

The browser control unit 412 analyzes the content 380, executes the content 380 after making the content 380 into a database having a predetermined data structure, and carries out drawing processing. Moreover, the browser control unit 412 cashes the content 380 itself or communication data in order to eliminate necessity for acquiring again the content 380 acquired from the server 30 or the like. Moreover, the browser control unit 412 stores a browsing history of the contents 380, provides a history list to the user, and displays again a content corresponding to a selected history. Moreover, the browser control unit 412 supervises inputs/outputs, and provides a user interface.

The memory management unit 420 includes a finish content determination unit 430, a browser state check unit 431, a system-side memory monitoring unit 432, a content check unit 433, a content DB 434, a content type DB 435, a vehicle state monitoring unit 440, and an in-vehicle terminal state monitoring unit 450.

The browser state check unit 431 inquires the browser control unit 412 of whether the browser 400 is in the foreground state or the background state in the in-vehicle terminal 10, and notifies the finish content determination unit 430 of the reply to the inquiry. Note that, whether the browser 400 is in the foreground state or in the background state is managed by the display management unit 324. Therefore, the browser state check unit 431 may inquire the display management unit 324 of whether the browser 400 in the foreground state or in the background state.

The system-side memory monitoring unit 432 acquires a memory amount being used by the browser 400 from the system-side memory management unit 490, and notifies the finish content determination unit 430 of a remaining memory capacity available for the browser 400. Note that, the available memory amount for the browser 400 is set to the system-side memory monitoring unit 432. The system-side memory monitoring unit 432 subtracts the memory usage of the browser 400 acquired from the system-side memory management unit 490 from the available memory amount, to thereby calculate the remaining memory capacity available for the browser 400. A timing of notifying the finish content determination unit 430 of the remaining memory capacity may be an arbitrary timing such as a timing of reception of a calculation request for the remaining memory capacity or a periodical timing.

The content check unit 433 acquires a list of the contents 380 running on the browser 400 from the browser control unit 412, and notifies the finish content determination unit 430 of the acquired list.

FIG. 3 is a diagram for showing a data structure of the content DB 434. As shown in FIG. 3, sets of a content identifier 434a, a content name 434b, and a content type 434c associated with one another are stored in the content DB 434.

The content identifier 434a is unique information that can identify a content. For example, the content identifier 434a stores a uniform reference locator (URL) for allowing access to the content.

The content name 434b is a name of the content identified by the content identifier 434a. The content name 434b is a content name such as "Point of Interest (POI) search", "simultaneous interpretation", or "remote failure diagnosis".

The content type 434c is a type of the content identified by the content identifier 434a. The content type 434c is a content type such as "navigation cooperation", "audio", or "vehicle cooperation". Note that, the type of the content stored in the content type 434c is any one of content types registered to the content type DB 435.

Figure 4:
FIG. 4 is a diagram for illustrating a data structure of a content type DB.

FIG. 4 is a diagram for showing a data structure of the content type DB 435. As shown in FIG. 4, sets of a content type 435a and an "allowed/not allowed to be finished during travel" 435b associated with one another are stored in the content type DB 435.

The content type 435a is the type of the content, and the "allowed/not allowed to be finished during travel" 435b is information on whether the finish of the content is allowed or not during the travel. For example, a content whose content type is "video" is stored in association with attribute information in which the finish is "allowed" in advance. In contrast, for example, a content such as audio or speech recognition, which is generally used during the driving and does not pose a safety problem, is stored in association with attribute information in which the finish is "not allowed" in advance. Moreover, a content type "vehicle cooperation", to which a content "remote failure diagnosis" belongs, requires continuous acquisition of information used to remotely determine whether a failure exists or not and which part is failed when a failure actually exists. Thus, the content type "vehicle cooperation" is stored in association with attribute information in which the finish is "not allowed" in advance.

Note that, the content DB 434 and the content type DB 435 are assumed to be appropriately rewritten when update information is acquired via the server 30 or the communication terminal 20.

The vehicle state monitoring unit 440 acquires the states of the vehicle such as a travel state from the vehicle information acquisition unit 492, and passes the states to the finish content determination unit 430. Note that, the states of the vehicle are not limited to states relating to the travel, such as a steering angle, a brake depressing force, and a vehicle speed, but include other various types of information relating to the vehicle, such as a remaining amount of a fuel, a time zone, a precipitation, an external temperature, and a cruising distance.

The in-vehicle terminal state monitoring unit 450 connects to programs other than the browser 400 out of programs executed on the in-vehicle terminal 10 such as the telephone call unit 480, the movie playback unit 481, the music playback unit 482, the navigation unit 483, and the speech recognition unit 484, to thereby collect execution states of the programs, and notifies the finish content determination unit 430 of the execution states as states of the in-vehicle terminal 10. Note that, the execution states of the programs whose main processing is input/output of sounds, such as the telephone call unit 480, the music playback unit 482, and the speech recognition unit 484, can be determined also by the sound management unit 326 configured to manage input/output of sounds, and hence the in-vehicle terminal state monitoring unit 450 may inquire the sound management unit 326 of the execution state of the programs. Similarly, the in-vehicle terminal state monitoring unit 450 may inquire the communication unit 320 of the execution state of a program whose execution state can be determined by absence/presence of communication, to thereby collect the execution state, and may inquire the display management unit 324 of the execution state of a program whose execution state can be determined by absence/presence of display, to thereby collect the execution state. Moreover, when the OS provides the execution state of a program, the in-vehicle terminal state monitoring unit 450 may inquire the OS of the execution state of the program, to thereby collect the execution state of the program.

The finish content determination unit 430 acquires the information from the browser state check unit 431, the system-side memory monitoring unit 432, the content check unit 433, the content DB 434, the content type DB 435, the vehicle state monitoring unit 440, and the in-vehicle terminal state monitoring unit 450, and recognizes the execution state of the browser 400, the remaining memory capacity available for the browser 400, the contents running on the browser 400, the states of the vehicle 50, and the states of the in-vehicle terminal 10, thereby determining an optimal content to be finished when memory insufficiency is detected. Note that, the reason for finishing the content when the memory is insufficient is an intention to increase the remaining memory capacity by freeing and reusing a memory area used by the content to be finished. However, depending on the state, as described above, there are a content that is less likely to pose a problem even when the content is finished and a content that poses inconvenience when the content is finished. In this case, when a content is appropriately finished to safely increase the remaining memory capacity, the finish content determining unit 430 is considered to appropriately determine the content to be finished.

The configuration of the in-vehicle terminal has been summarized. Note that, the in-vehicle terminal 10 is typically a navigation apparatus or the like, but is not limited thereto, and maybe an electronic information terminal such as a personal computer, which is a general purpose computer, a cellular phone terminal, a tablet terminal, a portable navigation device (PND), and a personal digital assistance (PDA).

Figure 5:
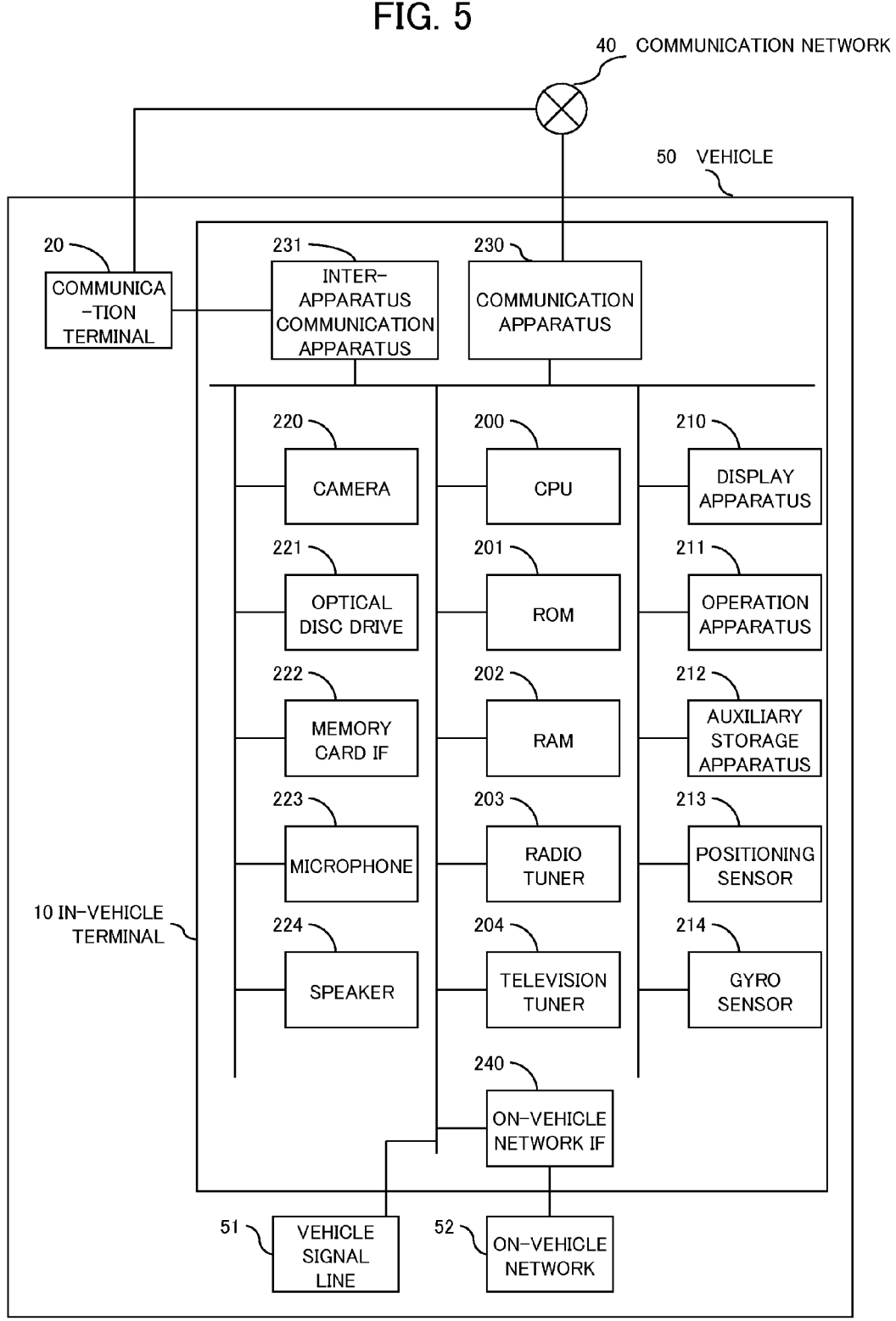
FIG. 5 is a diagram for illustrating a configuration of hardware of the in-vehicle terminal.

FIG. 5 is a diagram for illustrating a hardware configuration of the in-vehicle terminal 10 according to this embodiment. The in-vehicle terminal 10 includes a central processing unit (CPU) 200, a read only memory (ROM) 201, a RAM 202, a radio tuner 203, a television tuner 204, a display apparatus 210, an operation apparatus 211, an auxiliary storage apparatus 212, a positioning sensor 213, a gyro sensor 214, a camera 220, an optical disc drive 221, a memory card interface (IF) 222, a microphone 223, a speaker 224, a communication apparatus 230, an inter-apparatus communication apparatus 231, and an on-vehicle network interface IF 240.

The CPU 200 is an apparatus for controlling respective parts of the in-vehicle terminal 10, and carrying out calculation by following a car navigation program and a browser program loaded on the RAM 202.

The ROM 201 is a read-only storage apparatus in which a control program and the like are written.

The RAM 202 is an apparatus for reading and temporarily storing the programs stored in the auxiliary storage apparatus 212, and storing work data and the like generated when the CPU 200 executes the program.

The radio tuner 203 is an apparatus for receiving radio waves such as the short wave, the medium wave, and the ultrashort wave, tuning to a station, and listening to a program. In particular, as reception of an FM multiplex broadcast, the radio tuner 203 can receive the traffic information from the vehicle information and communication system (VICS) (trademark).

The television tuner 204 is an apparatus for receiving a radio wave of an ultrashort wave, tuning to a station, and reproducing a movie as a TV program.

The display apparatus 210 is an apparatus, such as a liquid crystal display or an organic electro-luminescence (EL) display, for displaying image information for the occupants.

The operation apparatus 211 is an apparatus such as a button, a switch, a keyboard, and a touch panel, which is used by the occupants to operate the in-vehicle terminal 10 with the fingers.

The auxiliary storage apparatus 212 is a high capacity storage apparatus, such as a hard disk drive (HDD) or a solid state drive (SSD), for storing programs such as the car navigation and the browser, and various types of data such as map data and setting files used by those programs. Note that, when the information becomes obsolete and various types of data needs to be replaced, the in-vehicle terminal 10 can use the communication apparatus 230 or the like to connect to the communication network 40, to thereby acquire and update the various types of data stored in the auxiliary storage apparatus 212 from a server connected to the communication network 40. Moreover, the in-vehicle terminal 10 can also acquire latest versions of the software programs such as the browser 400 from the server and updates the software programs to the latest versions.

The positioning sensor 213 is a sensor for using a plurality of satellite waves or a plurality of radio waves from wireless LANs, to thereby acquire the own position represented by the latitude and longitude on the earth.

The gyro sensor 214 is a sensor for measuring an angle or an angular velocity of the vehicle.

The camera 220 is an optical apparatus for imaging an external environment of the vehicle 50, and takes in the external environment as image information.

The optical disc drive 221 is an apparatus for reading an optical disc such as a compact disc (CD) (trademark), a DVD (trademark), and a Blu-ray disc (trademark), to read music data or video data.

The memory card IF 222 is an interface for carrying out reading and writing on a memory card, which is a nonvolatile storage medium, and the like.

The microphone 223 is an apparatus for collecting speeches of the occupants.

The speaker 224 is an apparatus for outputting music information played back on the in-vehicle terminal 10, a sound guidance for a route guidance, operation sounds, and the like.

The communication apparatus 230 is an apparatus, such as a telematics control unit (TCU), for carrying out data communication to/from and making/receiving a telephone call to/from the server 30 via the communication network 40.

The inter-apparatus communication apparatus 231 is an interface apparatus for connecting to the communication terminal 20, to thereby communicate data. A connection type may be a wired connection compliant with a standard such as the universal serial bus (USB) and the high-definition multimedia interface (HDMI) or a wireless connection compliant with a standard such as the IEEE 802.11a/b/g/n/ac for a wireless local area network (LAN) and the Bluetooth (trademark).

The on-vehicle network IF 240 is an apparatus for connecting to an on-vehicle network 52, and taking data acquired from the on-vehicle network 52 such as a controller area network (CAN) and a local interconnect network (LIN) and representing the travel states and internal states of the vehicle 50 into the inside.

Moreover, the in-vehicle terminal 10 is also connected to the vehicle signal line 51, and can acquire the travel states and the internal states of the vehicle 50.

The control management unit 322, the display management unit 324, the sound management unit 326, the telephone call unit 480, the movie playback unit 481, the music playback unit 482, the navigation unit 483, the speech recognition unit 484, the browser 400, and the system-side memory management unit 490 of the in-vehicle terminal 10 are realized by a program for causing the CPU 200 to carry out the processing. This program is stored in the auxiliary storage apparatus 212, is loaded on the RAM 202 upon the execution, and is executed by the CPU 200.

Moreover, the communication unit 320 is realized by the communication apparatus 230 and the inter-apparatus communication apparatus 231. The content DB 434 and the content type DB 435 are realized by the auxiliary storage apparatus 212 or the RAM 202. The vehicle information acquisition unit 492 is realized by the on-vehicle network IF 240.

The hardware configuration example of the in-vehicle terminal 10 according to this embodiment has been described. However, the hardware configuration is not limited to this example, and may be constructed by other similar hardware.

Figure 6:
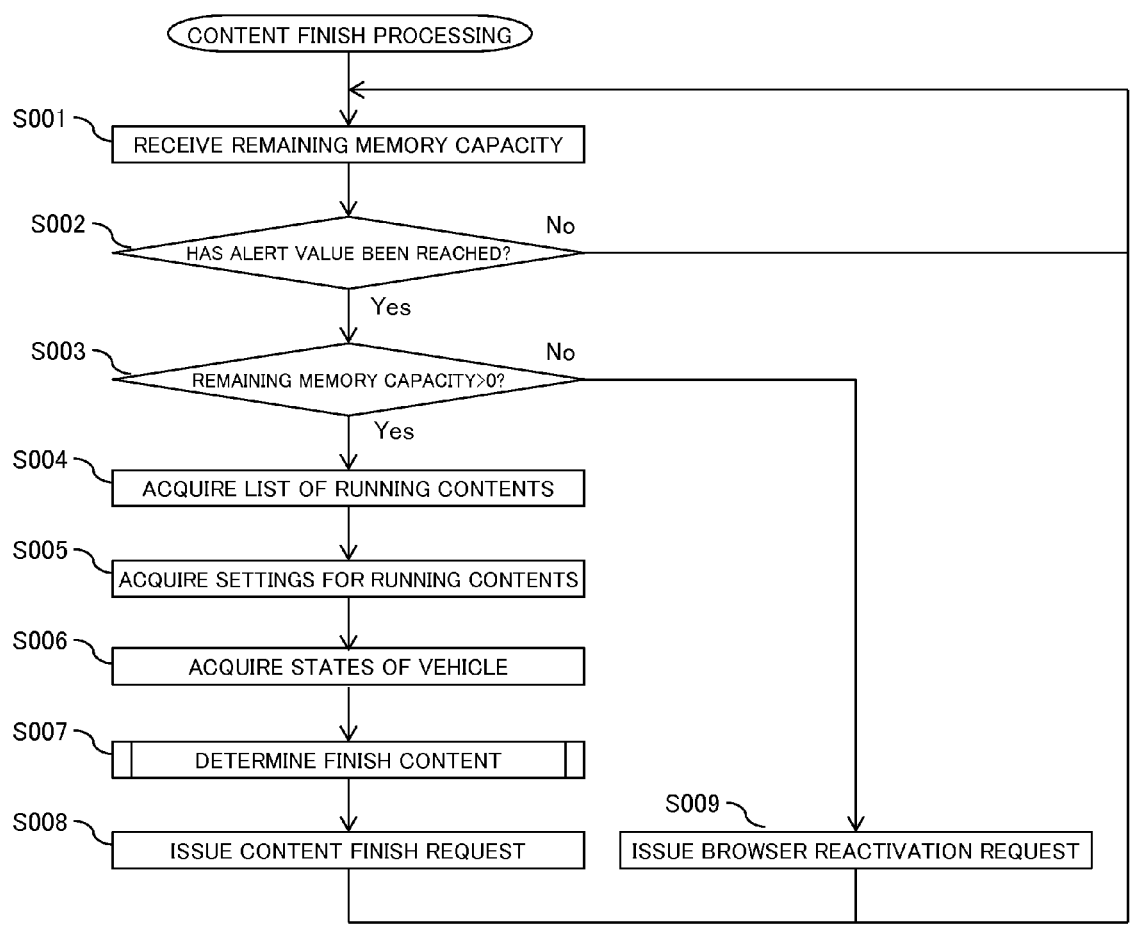
FIG. 6 is a flowchart for illustrating a flow of content finish processing.

FIG. 6 is a flowchart for illustrating a processing flow of content finish processing. The content finish processing is carried out at a predetermined timing (periodically such as a timing when the content communicates to/from the outside via the browser communication unit 340, a timing when the control management unit 322 detects an operation of the occupant, or once in every five minutes) after the activation of the in-vehicle terminal 10.

First, the finish content determination unit 430 acquires the remaining memory capacity available for the browser from the system-side memory monitoring unit 432 (Step S001). In other words, the system-side memory monitoring unit 432 subtracts the memory usage of the browser 400 acquired from the system-side memory management unit 490 from the available memory amount, to thereby calculate the remaining memory capacity available for the browser 400, and passes the available remaining memory capacity to the finish content determination unit 430.

Then, the finish content determination unit 430 determines whether or not the available remaining memory capacity has reached an alert value (is equal to or less than the alert value), which is a threshold set in advance (Step S002). When the available remaining memory capacity has not reached the alert level (that is, more than the alert value), the finish content determination unit 430 returns the control to Step S001.

When the available remaining memory capacity has reached the alert value ("Yes" in Step S002), the finish content determination unit 430 determines whether or not the memory usage has reached an upper limit of the memory usage assigned to the browser 400 in advance (Step S003). In other words, the finish content determination unit 430 determines whether the remaining memory capacity is more than 0 or not. When the remaining memory capacity is equal to or less than 0, this state represents that the memory usage of the browser 400 has reached the upper limit of the memory amount available for the browser 400, and hence influence on operations of other programs and a forced termination of the in-vehicle terminal 10 by the OS may occur. Therefore, the finish content determination unit 430 advances the control to Step S009 described later.

When the remaining memory capacity is more than 0 ("Yes" in Step S003), the finish content determination unit 430 acquires a list of the running contents 380 (Step S004). Specifically, the finish content determination unit 430 acquires the list of the contents 380 running on the browser 400, and used periods, namely, an elapsed period after the last use of the respective contents 380, from the content check unit 433. A start point of the used period, namely, the elapsed period of the last use may be any one of a timing at which the content enters the background processing and transitions to a state in which the user cannot view the content, and a timing at which the content finishes the communication to/from other apparatus including the server 30 during the background processing and stops the operation.

Then, the finish content determination unit 430 acquires settings for the running contents 380 from the content DB 434 (Step S005). Specifically, the finish content determination unit 430 acquires the content types 434c associated with the respective contents 380 included in the list of the contents 380 acquired in Step S004 from the content DB 434 and the finish possibilities during travel 435b for the respective content types from the content type DB 435.

Then, the finish content determination unit 430 acquires the states of the vehicle from the vehicle state monitoring unit 440 (Step S006).

Then, the finish content determination unit 430 carries out finish content determination processing (Step S007). Details of the finish content determination processing are described later.

Then, the finish content determination unit 430 issues a content finish request to the browser control unit 412 (Step S008). Specifically, the finish content determination unit 430 passes the finish request for the content to be finished determined in Step S007 to the browser control unit 412, and returns the control to Step S001.

Moreover, when the remaining memory capacity is equal to or less than 0 ("No" in Step S003), the finish content determination unit 430 issues a browser reactivation request to the browser control unit 412 (Step S009). When the browser is reactivated, the memory is once cleared, which enables reuse of a memory area that is not used but is not freed. Then, the finish content determination unit 430 returns the control to Step S001.

The processing flow of the content finish processing has been described. When the remaining memory capacity becomes less than the predetermined threshold, the content finish processing determines the content to be finished out of the contents running on the browser 400, which is the content execution unit, and can issue the instruction to finish the content to the browser 400.

Figure 7:
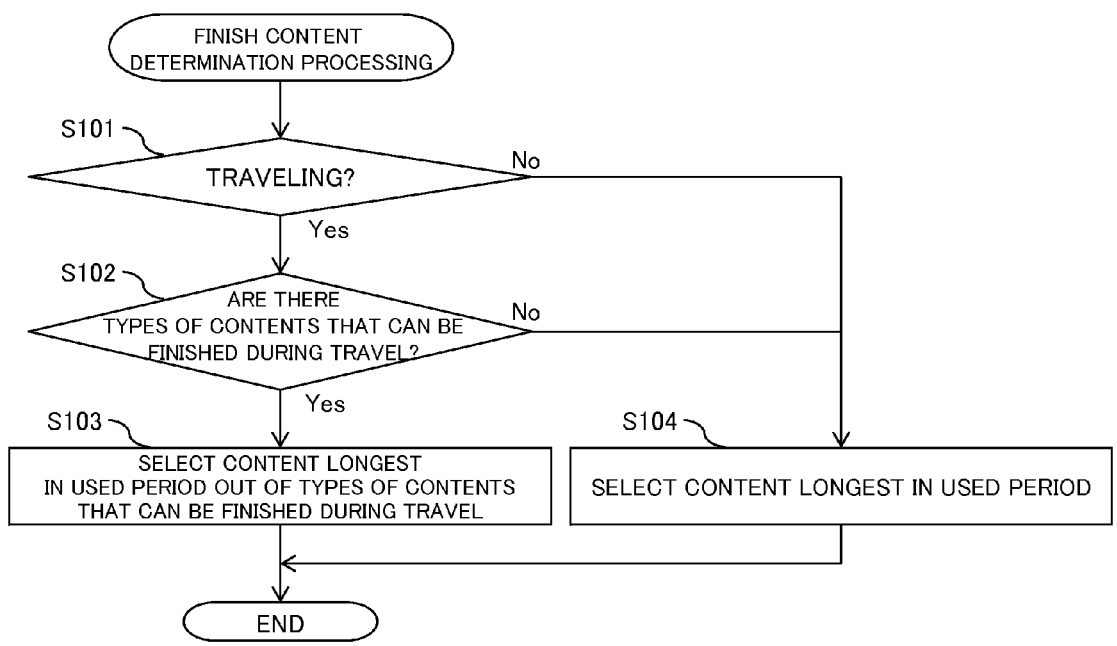
FIG. 7 is a flowchart for illustrating a flow of finish content determination processing.

FIG. 7 is a flowchart for illustrating a processing flow of the finish content determination processing. The finish content determination processing is the processing carried out in Step S007 of the content finish processing.

First, the finish content determination unit 430 determines whether the vehicle is traveling or not (Step S101). Specifically, the finish content determination unit 430 refers to the information on the vehicle on which the in-vehicle terminal 10 is installed, which is acquired in Step S006 of the content finish processing, and determines that the vehicle is traveling, for example, when the vehicle speed is more than 0 and a parking brake is released. When the vehicle is not traveling ("No" in Step S101), the finish content determination unit 430 advances the control to Step S104 described later.

When the vehicle is traveling ("Yes" in Step S101), the finish content determination unit 430 determines whether contents belonging to the type that can be finished during the travel are running or not (Step S102). Specifically, the finish content determination unit 430 determines whether or not the contents 380 belonging to the list of the contents 380 acquired in Step S004 of the content finish processing include at least one content 380 belonging to the content type associated with the "allowed/not allowed to be finished during travel" 435b of "allowed". When the content of the type that can be finished during the travel does not exist, the finish content determination unit 430 advances the control to Step S104 described later.

When the contents belonging to the types that can be finished during the travel are running ("Yes" in Step S102), the finish content determination unit 430 selects a content having the longest used period out of the contents of the types that can be finished during the travel as the content to be finished (Step S103). Specifically, the finish content determination unit 430 selects the content having the longest period after the last use (least recently used (LRU)) out of the contents of the types that can be finished during the travel. Note that, the number of the contents to be selected by the processing is not limited to 1. For example, a plurality of contents having approximately the same elapsed period (different from one another by three seconds) or less may be selected in the descending order of the memory usage.

When the vehicle is not traveling, or contents that can be finished during the travel are not running ("No" in Step S101 or "No" in Step S102), the finish content determination unit 430 selects a content having the longest used period as the content to be finished out of the running contents (Step S104). Specifically, the finish content determination unit 430 selects the content having the longest period after the last use out of the running contents.

The processing flow of the finish content determination processing has been described. According to the finish content determination processing, the finish content determination unit 430 can determine the content to be finished out of the contents belonging to the types of contents that can be finished and using the memory in the content execution unit, depending on the travel states of the vehicle.

Figure 8:
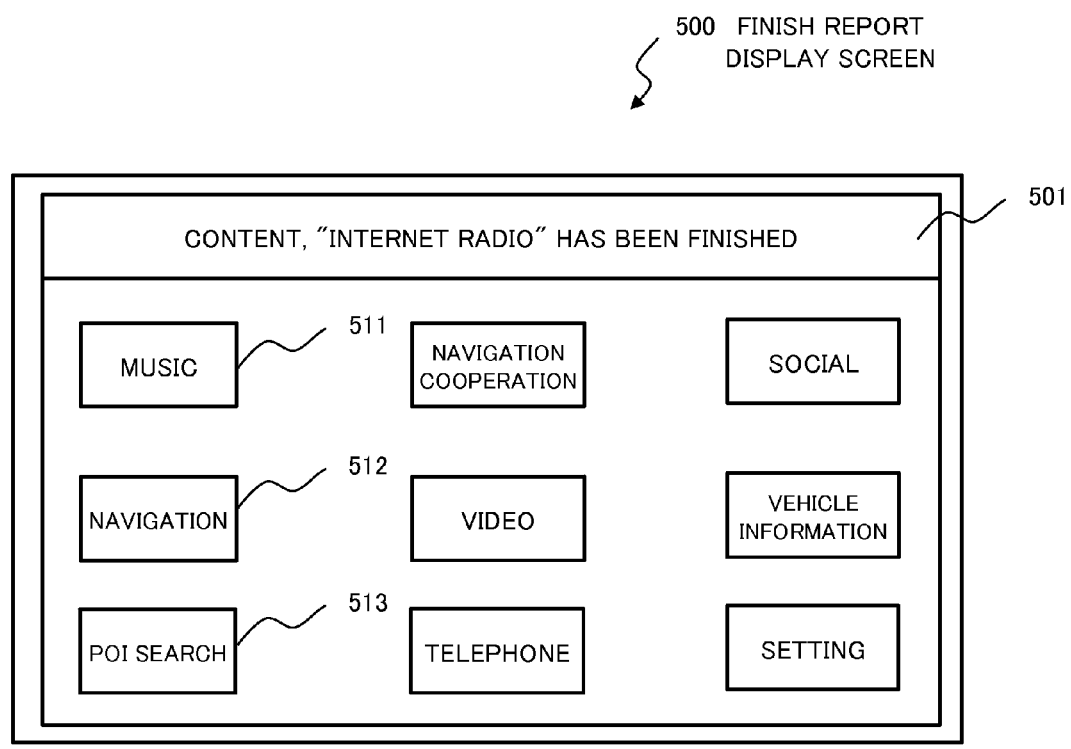
FIG. 8 is a diagram for illustrating an example of a finish report display screen.

FIG. 8 is a diagram for showing an example of a finish report display screen 500. As the finish report display screen 500, a menu screen is used as an example, but the finish report display screen 500 is not limited to the menu screen, and may be a map display screen for the active navigation, or a screen on which a movie is being played back. The finish report display screen 500 includes a content finish display message display area 501, a music menu icon display area 511, a navigation icon display area 512, a POI search icon display area 513, and display areas for icons for other respective functions.

The content finish display message display area 501 is a display area arranged, for example, near a top end of the screen, and an area capable of displaying a message such as "Content 'Internet radio' is finished" as a sentence.

A description has been given of a first embodiment of the present invention. According to the first embodiment, even when the number of contents on the browser 400 is 1, the in-vehicle terminal 10 may pass the finish request for the content to the browser control unit 412, but the present invention is not limited to this configuration. For example, when only one content is running, and the browser is executed in the background state, the browser may be reactivated. When the browser is executed in the foreground state, the browser may not be finished.

A description is now given of a second embodiment of the present invention configured as described above. The second embodiment is basically the same as the first embodiment, and hence a description is mainly given of differences. Moreover, the same components as those of the first embodiment are denoted by the same reference numerals.

Figure 9:
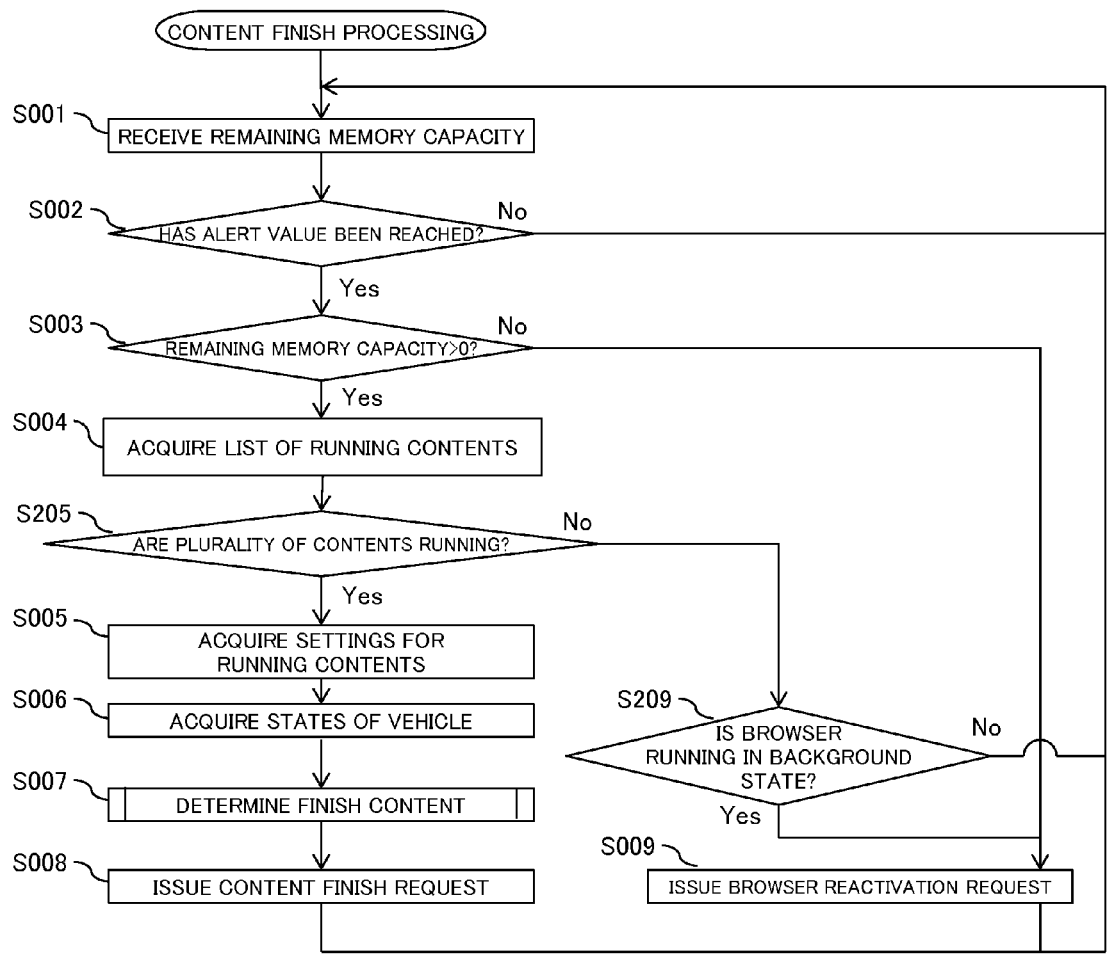
FIG. 9 is a flowchart for illustrating a flow of content finish processing according to a second embodiment of the present invention.

FIG. 9 is a flowchart for illustrating a flow of the content finish processing according to the second embodiment. As illustrated in FIG. 9, according to the second embodiment, in the content finish processing, after the processing in Step S004 of acquiring the list of the running contents, the finish content determination unit 430 determines whether a plurality of contents are running or not (Step S205). When a plurality of contents are running ("Yes" in Step S205), the finish content determination unit 430 carries out the same subsequent processing as in the first embodiment.

When a plurality of contents are not running ("No" in Step S205), the finish content determination unit 430 determines whether the browser 400 is running in the background state or not (Step S209). Specifically, the finish content determination unit 430 inquires the browser state check unit 431 of the execution state, and determines whether the acquired execution state is the foreground state or the background state. Then, when the browser 400 is not running in the background state ("No" in Step S209), the finish content determination unit 430 returns the control to Step S001.

When the browser 400 is running in the background state ("Yes" in Step S209), the finish content determination unit 430 issues the browser reactivation request to the browser control unit 412 as in Step S009.

A description has been given of the second embodiment. According to the second embodiment, when a single content uses the memory on the browser 400, which is the content execution unit, and the browser 400 is running in the background state, the finish content determination unit 430 issues the instruction to reactivate the browser 400 to the browser 400. When a plurality of contents use the memory on the browser 400, the finish content determination unit 430 determines a content to be finished out of the contents using the memory on the browser 400 depending on the travel state of the vehicle, and issues the instruction to finish the content to the browser 400. In other words, when the number of the running contents is 1, and the browser 400 is in the background state, it is confirmed that the occupant is not viewing the browser 400, and hence the reactivation processing for the browser 400 can easily be carried out. Conversely, when the browser is in the foreground state, the occupant may be viewing the browser 400 or using the browser 400 for the communication to/from the server 30 or the like, and hence the reactivation of the browser 400 can be avoided.

Moreover, according to the first embodiment, when a conflict of hardware resources between the in-vehicle terminal 10 and the browser 400 or other software programs (such as a conflict of the speaker between the Internet radio and a music player) occurs, the in-vehicle terminal 10 determines a content to be finished independently of the conflict, but the present invention is not limited to this configuration. For example, when a conflicting content exists, the content may be finished preferentially.

A description is now given of a third embodiment of the present invention configured as described above. The third embodiment is basically the same as the first embodiment, and hence a description is mainly given of differences. Moreover, the same components as those of the first embodiment are denoted by the same reference numerals.

Figure 10:
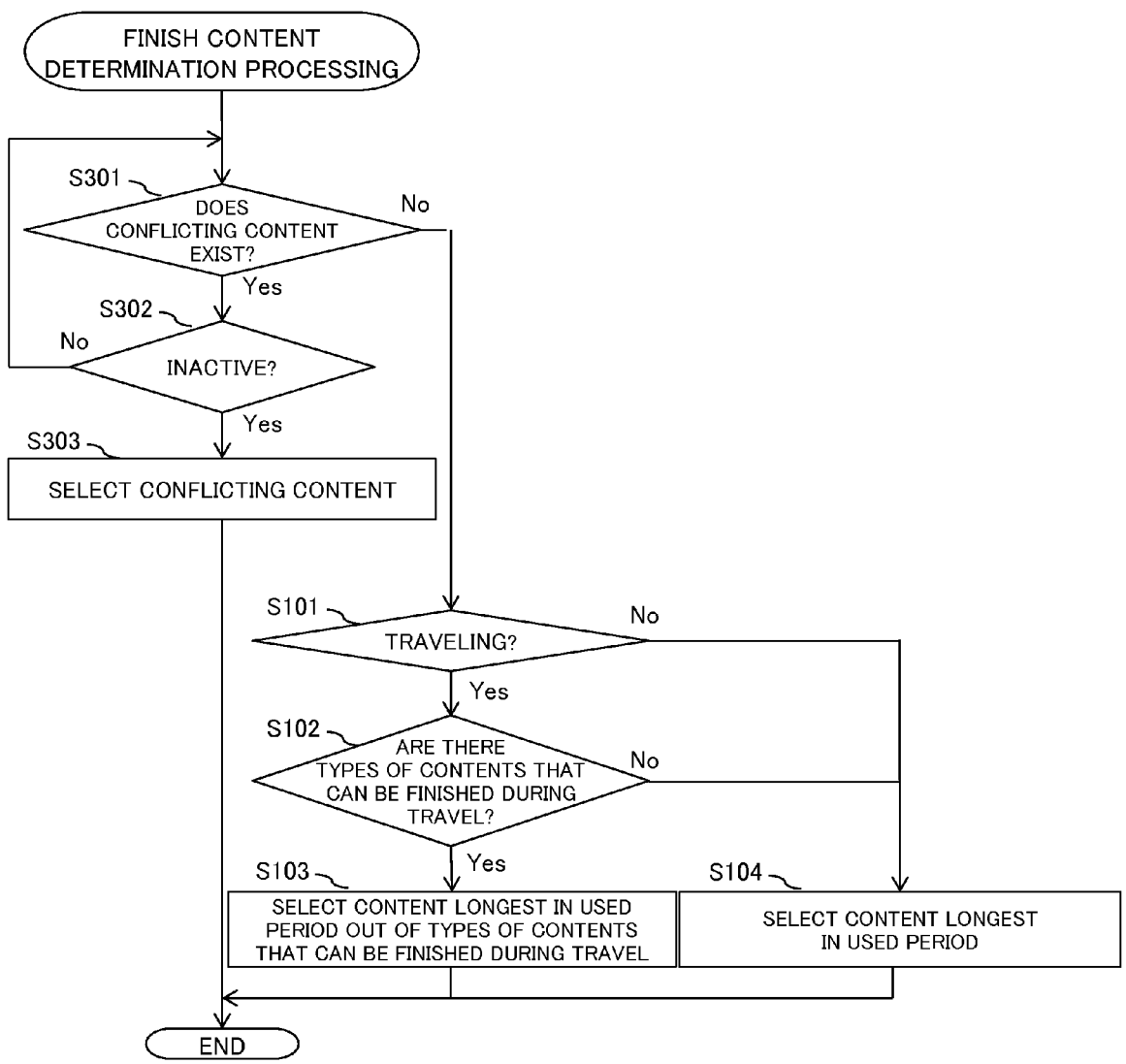
FIG. 10 is a flowchart for illustrating a flow of finish content determination processing according to a third embodiment of the present invention.

FIG. 10 is a flowchart for illustrating a processing flow of the finish content determination processing according to the third embodiment. As illustrated in FIG. 10, according to the third embodiment, in the finish content determination processing, the finish content determination unit 430 determines, before the processing in Step S305 of determining whether the vehicle is traveling or not, uses the in-vehicle terminal state monitoring unit 450 to determine whether a conflicting content exists or not (Step S301). When a conflicting content does not exist ("No" in Step S301), the finish content determination unit 430 carries out processing corresponding to Steps S101 to S104 according to the first embodiment. On this occasion, a content 380 running on the browser 400 is considered to be conflicting when the function of the content 380 provided to the occupant is equivalent to a function provided to the occupant by a program other than the browser running on the in-vehicle terminal 10, and the program is running. For example, the telephone call unit 480 is the telephone call function provided for the in-vehicle terminal 10, and a content whose content type 434*c* is the telephone call is also a content relating to the telephone call, and both use the same hardware resources (microphone 223 and speaker 224) provided by the in-vehicle terminal 10. Only one of the telephone call unit 480 and the content can use the microphone 223 and the speaker 224, and hence when the telephone call unit 480 is running, the content whose content type 434*c* is the telephone call is in a state in which the content cannot be executed. Thus, when a conflicting content exists, the content whose content type 434*c* is conflicting is finished preferentially. Note that, the movie playback unit 481 may be conflicting with a content whose content type 434*c* is video; the music playback unit 482, audio; the navigation unit 483, navigation cooperation; and the speech recognition unit 484, speech recognition.

When a conflicting content exists ("Yes" in Step S301), the finish content determination unit 430 determines whether the conflicting content is inactive or not (Step S302). Specifically, the finish content determination unit 430 inquires the browser control unit 412 of whether the content is inactive or not. Note that, the inactive state is a state in which the content is running on the browser 400, but another program of the in-vehicle terminal 10 is using hardware resources such as the screen display and the sound output of the in-vehicle terminal 10. Whether this content of the browser 400 is in the inactive state or not is managed by the display management unit 324 and the sound management unit 326. Therefore, the finish content determination unit 430 may not inquire the browser control unit 412, but may inquire directly the display management unit 324 and the sound management unit 326 of the state.

For example, when the content whose content name is "Internet radio" is running on the browser 400, the content type is the audio, and hence when the music playback unit 482 is active, the conflicting state exists. When the in-vehicle terminal state monitoring unit 450 confirms that the music playback unit 482 is running, the finish content determination unit 430 inquires the browser control unit 412 of whether an identifier (http://xxx.d.html) of the Internet radio of the browser 400 is inactive or not. When the content is active, the finish content determination unit 430 returns the control to Step S301, and finds another conflicting content.

When the content is inactive ("Yes" in Step S302), the finish content determination unit 430 selects a content conflicting with another application processing unit for the hardware resources as the content to be finished (Step S303).

A description has been given of the third embodiment. According to the third embodiment, when the content executed by the browser 400 and the in-vehicle terminal 10 are conflicting with each other for the hardware resource, the memory can be safely freed by issuing the instruction to finish the content relating to the hardware resource conflict to the browser.

Moreover, according to the third embodiment, the in-vehicle terminal 10 sets a content that is high in importance and should thus be prevented from being finished as much as possible in order to maintain convenience of the occupants and functionality of the in-vehicle terminal 10, as a content to be finished when the used period is long, but the present invention is not limited to this configuration. For example, when there is a content maintained to be executed preferentially, the content may be prioritized.

A description is now given of a fourth embodiment of the present invention configured as described above. The fourth embodiment is basically the same as the third embodiment, and hence a description is mainly given of differences. Moreover, the same components as those of the third embodiment are denoted by the same reference numerals.

FIG. 11 is a diagram for showing a data structure of the content type DB according to the fourth embodiment. As shown in FIG. 11, according to the fourth embodiment, in place of the content type DB 435 according to the third embodiment, a content type DB 435' is provided. The content type DB 435' is basically the same as the content type DB 435, but a priority 435*c* is associated with each content type 435*a* in advance. Note that, as a value of the priority decreases, the priority of the execution increases, that is, the maintenance is prioritized. Moreover, the value of the priority can be changed by a setting input by the user except for a part of the content types whose priority cannot be changed. For example, there may be imposed such restrictions that, for content types having the priority of 10 or more, the priority cannot be set to a value of 9 or less, and, for content types having the priority of 9 or less, the priority cannot be changed.

Figure 12:
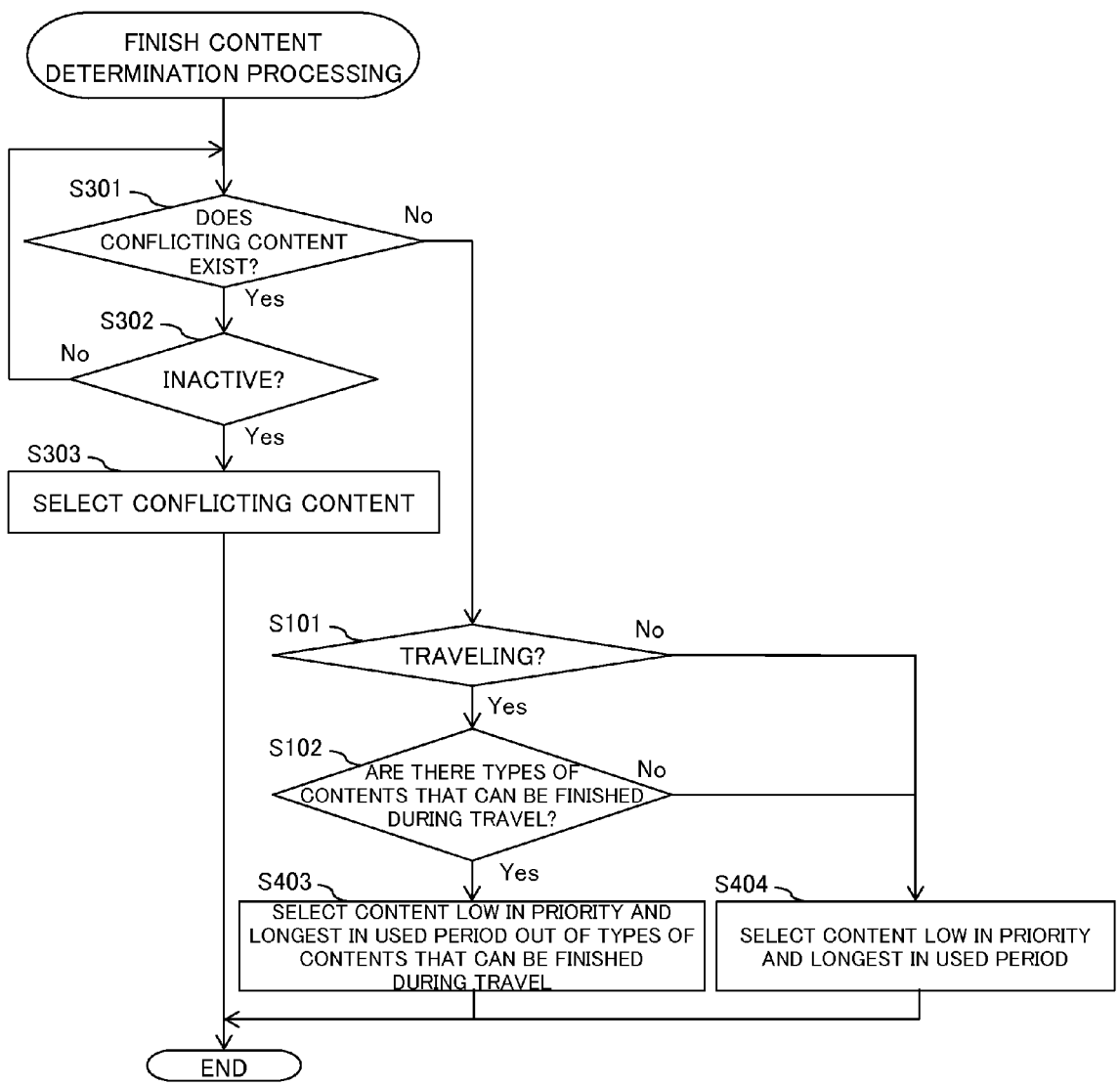
FIG. 12 is a flowchart for illustrating a flow of finish content determination processing according to the fourth embodiment.

FIG. 12 is a flowchart for illustrating a processing flow of the finish content determination processing according to the fourth embodiment. As illustrated in FIG. 12, according to the fourth embodiment, when contents of the types that can be finished during the travel are running ("Yes" in Step S102), the finish content determination unit 430 selects a content low in the priority and used for the longest period out of the contents of the types that can be finished during the travel (Step S403).

Moreover, when the vehicle is not traveling ("No" in Step S101), or when the contents of the types that can be finished during the travel are not running ("No" in Step S102), the finish content determination unit 430 selects a content low in the priority and used for the longest period (Step S404).

A description has been given of the fourth embodiment. According to the fourth embodiment, out of the contents executed on the browser 400, contents whose priority for the finishing is set higher are finished first, and hence the memory can be more appropriately freed.

Moreover, according to the first embodiment, when the browser 400 is reactivated, contents that are frequently used by the occupants and contents that are preferably immediately available in terms of the use of the in-vehicle terminal 10 are manually recovered, but the present invention is not limited to this configuration. For example, contents (hereinafter referred to as "resident contents") expected to be automatically executed when the browser 400 is activated and to be always active may be activated.

A description is now given of a fifth embodiment of the present invention configured as described above with reference to FIG. 13 and FIG. 14. The fifth embodiment is basically the same as the first embodiment, and hence a description is mainly given of differences. Moreover, the same components as those of the first embodiment are denoted by the same reference numerals.

FIG. 13 is a diagram for showing a data structure of a content DB according to the fifth embodiment. As shown in FIG. 13, according to the fifth embodiment, in place of the content DB 434 according to the first embodiment, a content DB 434' is provided. The content DB 434' is basically the same as the content DB 434, but a residence necessity 434*d* is further associated with each content identifier 434*a* in advance. Note that, the value of the residence necessity may be changed by a setting input by the user.

Figure 14:
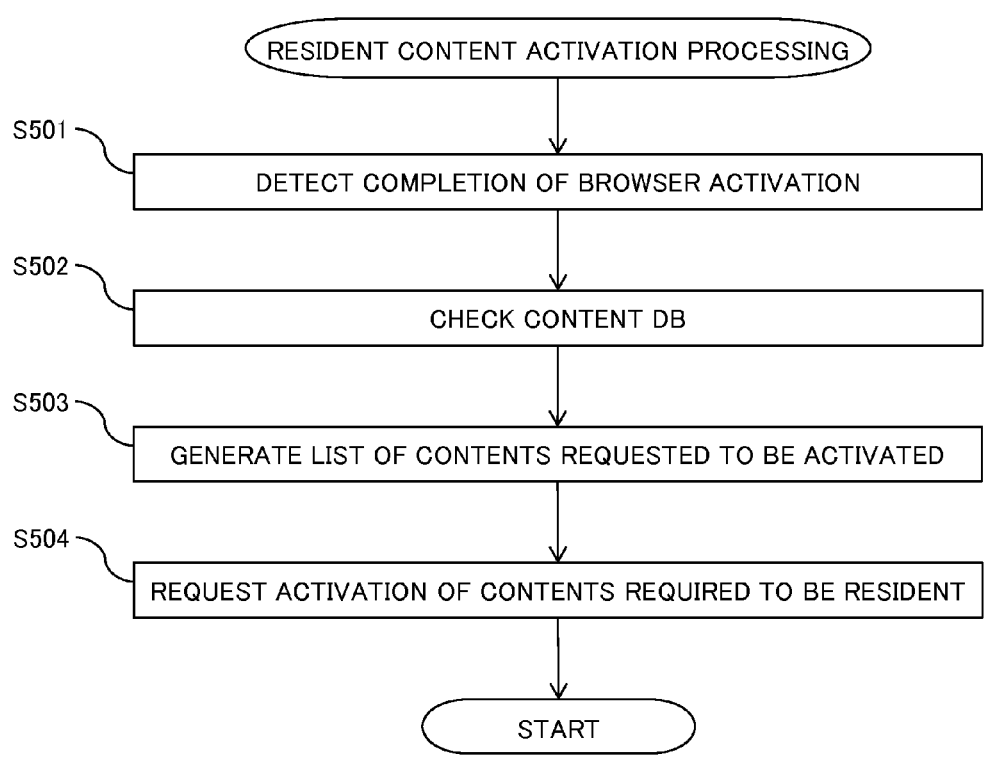
FIG. 14 is a flowchart for illustrating a flow of resident content activation processing according to the fifth embodiment.

FIG. 14 is a flowchart for illustrating a processing flow of resident content activation processing according to the fifth embodiment. The resident content activation processing is started when the browser 400 is activated or reactivated. Alternatively, the resident content activation processing may be periodically carried out.

First, the finish content determination unit 430 detects the activation completion of the browser 400 (Step S501). Specifically, the finish content determination unit 430 receives an activation completion notification for the browser 400 from the browser control unit 412.

Then, the finish content determination unit 430 checks the content DB 434' (Step S502). Specifically, the finish content determination unit 430 reads the content DB 434'.

Then, the finish content determination unit 430 generates a list of contents requested to be activated (Step S503). Specifically, the finish content determination unit 430 generates a list of the content identifiers 434*a* associated with the residence necessity 434*d* of "necessary".

Then, the finish content determination unit 430 requests the activation of the contents required to be resident (Step S504). Specifically, the finish content determination unit 430 transmits a request to activate the contents included in the list of the content identifiers 434*a* generated in Step S503 to the browser control unit 412.

The processing flow of the resident content activation processing has been described. The resident content activation processing can activate the contents registered in advance as the subject to the residence in synchronization with the timing of the activation of the browser 400.

A description has been given of the fifth embodiment. According to the fifth embodiment, the instruction to activate the contents required to be continuously executed can be issued to the browser 400, which is the content execution unit, based on the residence necessity information, and hence an interruption of the content to be resident can be minimized.

Moreover, according to the first embodiment, the memory management unit 420 is included in the browser 400, but the configuration is not limited to this example. For example, the memory management unit 420 may be operating as a unit independent of the browser 400.

A description is now given of a sixth embodiment of the present invention configured as described above with reference to FIG. 15. The sixth embodiment is basically the same as the first embodiment, and hence a description is mainly given of differences. Moreover, the same components as those of the first embodiment are denoted by the same reference numerals.

Figure 15:
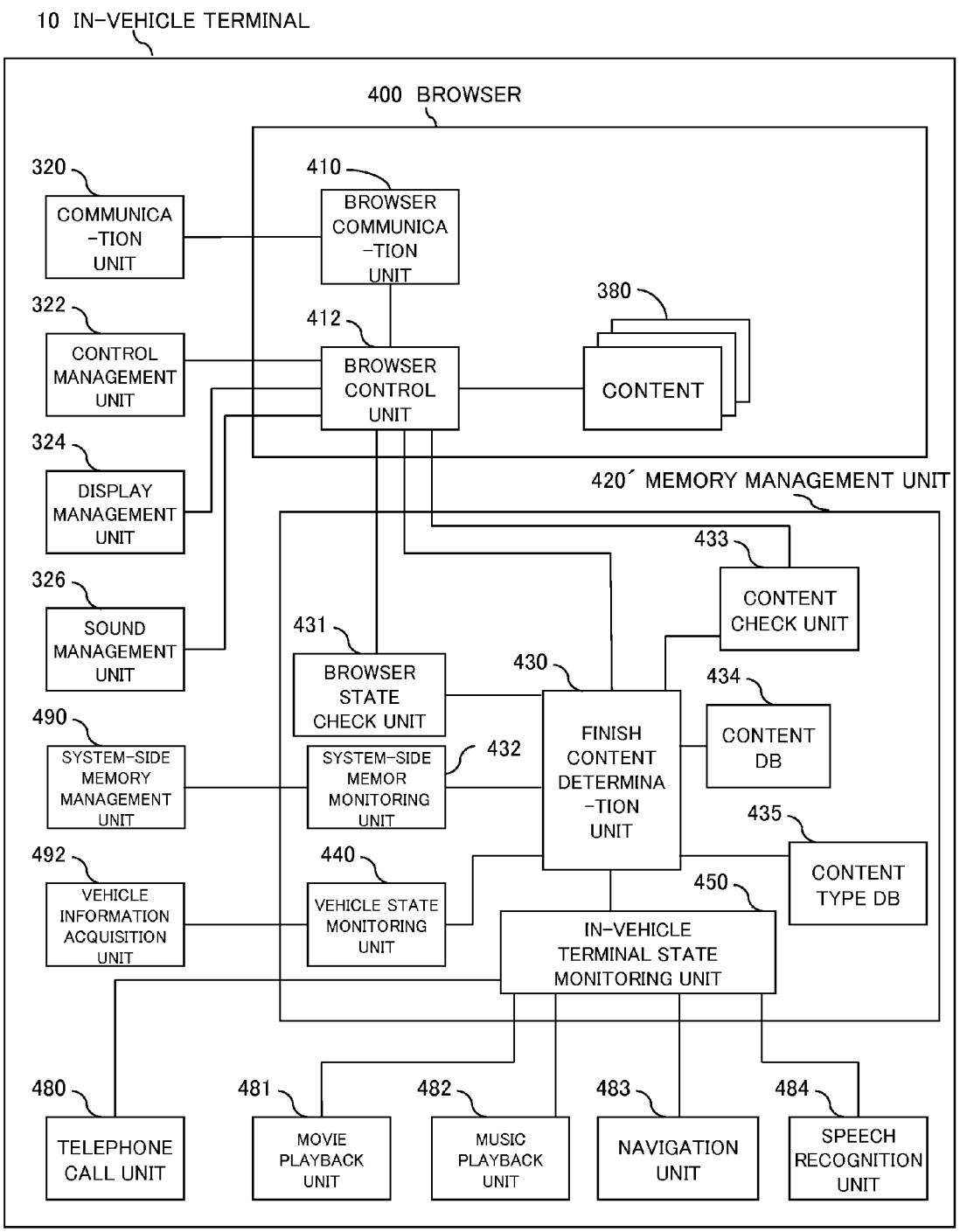
FIG. 15 is a diagram for illustrating a configuration example of an in-vehicle terminal according to a sixth embodiment of the present invention.

FIG. 15 is a diagram for illustrating a configuration example of an in-vehicle terminal 10 according to the sixth embodiment. In the in-vehicle terminal 10 according to the sixth embodiment, a memory management unit 420' is configured so as to be independent of the browser 400. Specifically, the memory management unit 420' is started and finished as a different process independent of a process of the browser 400. Further, the introduction and discard of the memory management unit 420' to and from the in-vehicle terminal 10 can be managed independently of the browser 400.

A description has been given of the sixth embodiment. According to the sixth embodiment, even if the in-vehicle terminal 10 employs a browser different from the browser 400 or a browser greatly changed in its functions as a result of an upgrade or the like, the browser can be operated by using the memory management unit 420'.

Moreover, in the sixth embodiment, the browser 400 is activated as a single process, but the configuration is not limited to this example. For example,processes of the browser 400 may be multiplexed, and may operate independently.

A description is now given of a seventh embodiment of the present invention configured as described above with reference to FIG. 16 and FIG. 17. The seventh embodiment is basically the same as the sixth embodiment, and hence a description is mainly given of differences. Moreover, the same components as those of the sixth embodiment are denoted by the same reference numerals.

Figure 16:
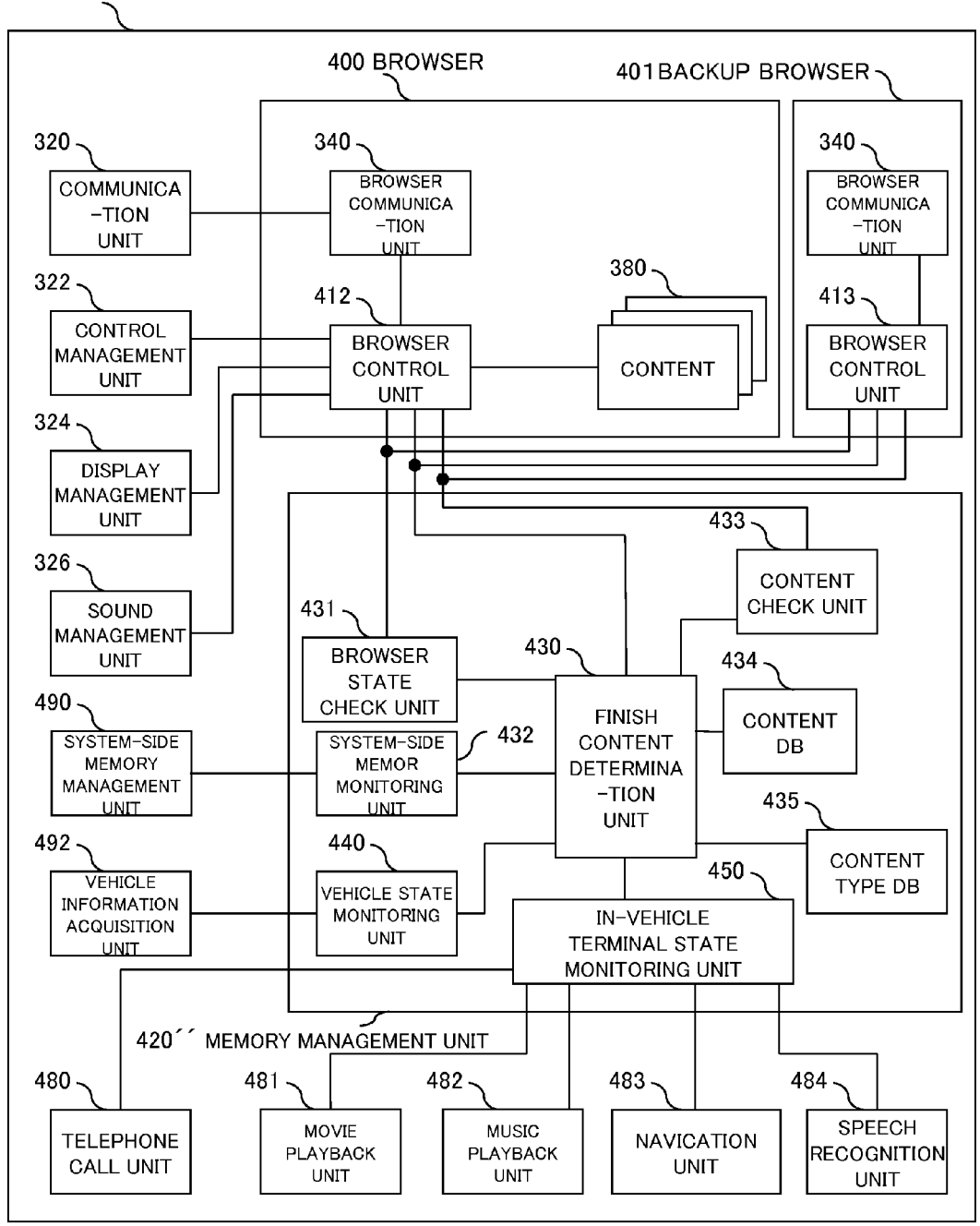
FIG. 16 is a diagram for illustrating a configuration example of an in-vehicle terminal according to a seventh embodiment of the present invention.

FIG. 16 is a diagram for illustrating a configuration example of an in-vehicle terminal 10 according to the seventh embodiment. The in-vehicle terminal 10 according to the seventh embodiment includes, in addition to the browser 400, a backup browser 401 having the same processing units. Specifically, the backup browser 401, which is independently started and finished, operates as a process different from the process of the browser 400. Further, the content 380 is not executed on the backup browser 401, and hence the memory usage of the browser 400 is larger than that of the backup browser 401. Further, the backup browser 401 is connected to the memory management unit 420' as in the browser 400, and is in a state capable of receiving a request of the memory management unit 420'.

FIG. 17 is a flowchart for illustrating a processing flow of browser reactivation start processing according to the seventh embodiment. The browser reactivation start processing is started when the memory management unit 420' makes the reactivation request for the browser 400. Alternatively, the browser reactivation start processing may be periodically carried out.

First, the finish content determination unit 430 detects the state in which the browser 400 is required to be reactivated (Step S601). Specifically, the finish content determination unit 430 receives the state in which the remaining memory capacity assigned to the browser 400 has become equal to or less than 0 from the system-side memory monitoring unit 432. In other words, the finish content determination unit 430 detects the state in which the remaining memory capacity has become equal to or less than 0, which is a second threshold less than the predetermined threshold.

Then, the finish content determination unit 430 issues an instruction to finish the browser 400 (Step S602). Specifically, the finish content determination unit 430 passes the finish request to the browser 400.

Then, the finish content determination unit 430 requests the OS to request the backup browser 401 to carry out the processing carried out by the browser 400, and to activate the resident contents, thereby causing the backup browser 401 to take over the control (Step S603).

Then, the finish content determination unit 430 requests the OS to activate a process for a new browser, and activates the new browser as the backup browser (Step S604).

Then, the finish content determination unit 430 requests the OS to set the activated browser as the backup browser (Step S605).

The processing flow of the browser reactivation start processing has been described. The browser reactivation start processing can set the backup browser 401 as a system in operation in synchronization with the timing when the browser 400 is reactivated. In other words, the finish content determination unit 430 starts the operation of a plurality of browsers 400 in parallel, when the remaining memory capacity becomes equal to or less than the second threshold less than the predetermined threshold, transmits the finish instruction to a browser 400 larger in the memory usage out of the browsers 400, and passes the execution control for contents to another browser 400 operating in parallel.

A description has been given of the seventh embodiment. In particular, the browser 400 of recent years is often larger in a program size than conventional browsers, and has such a problem that, when the browser 400 is reactivated, a time is necessary until the activation is completed again and the browser becomes available again for the occupants. The seventh embodiment of the present invention may avoid degrading the convenience of the occupants and the functionality of the in-vehicle terminal 10 by eliminating the period required for the reactivation of the browser when the reactivation of the browser becomes necessary.

Note that, in the first to seventh embodiments, control lines and information lines considered to be necessary for description are illustrated, and not all control lines and information lines are necessarily illustrated for the sake of nature of products. It may be considered that almost all configurations are actually mutually connected to one another.

Moreover, the respective configurations, functions, processing parts, and the like in part or entirety may be realized as hardware, for example, through designing by an integrated circuit. Moreover, the technical components according to the embodiments may be applied as a single part, or divided into a plurality of parts such as a program component and a hardware component to be applied.

The present invention has been described by referring mainly to the embodiments.

What is claimed is:

1. An information processing apparatus, comprising:
a content execution unit configured to execute a content;
a content type storage unit configured to store each type of the content in association with information for determining whether or not to allow finish of the execution during a travel of a vehicle;
a memory monitoring unit configured to identify a remaining memory capacity available for the content execution unit;
a travel state monitoring unit configured to acquire a state of the vehicle; and
a finish content determination unit configured to use, when the remaining memory capacity is less than a predetermined threshold, the content type storage unit to determine a content for which execution is allowed to be finished depending on the state of the vehicle acquired by the travel state monitoring unit, and issue a finish request for the content to the content execution unit.

2. An information processing apparatus according to claim 1, further comprising a browser state check unit configured to acquire an execution state of the content execution unit,
wherein, when the remaining memory capacity is less than the predetermined threshold, the finish content determination unit is configured to issue a request for reactivation when a number of the contents executed by the content execution unit is one and the execution state acquired by the browser state check unit is a background.

3. An information processing apparatus according to claim 1, wherein the finish content determination unit is configured to issue, when a hardware resource conflict occurs between the content executed by the content execution unit and the information processing apparatus, the finish request for the content relating to a conflicting hardware resource.

4. An information processing apparatus according to claim 3, wherein:
the each type of the content is stored in the content type storage part in association with a priority; and
the finish content determination unit is configured to issue the finish request for the content depending on the priority.

5. An information processing apparatus according to claim 1, further comprising a content storage unit configured to store each content in association with residence necessity information for identifying necessity for being always executed by the content execution unit,
wherein the finish content determination unit is configured to instruct, based on the residence necessity information, the content execution unit to activate the content that needs to always be executed.

6. An information processing apparatus according to claim 1, wherein the memory monitoring unit, the travel state monitoring unit, and the finish content determination unit operate as processes operating independently of the content execution unit.

7. A non-transitory computer-readable medium storing an execution management program for controlling execution of a content in an information processing apparatus configured to execute the content, the execution management program causing the information processing apparatus to execute the steps of:
identifying a remaining memory capacity available for a content execution unit;
acquiring a travel state of a vehicle; and
determining, when the remaining memory capacity is less than a predetermined threshold, depending on the state of the vehicle, a content for which execution is allowed to be finished, and issuing a finish request for the content.

8. The non-transitory computer-readable medium storing the execution management program according to claim 7, further causing the information processing apparatus to execute a step of issuing, when the remaining memory capacity is less than the predetermined threshold, a finish instruction to finish executing a content that is largest in a memory usage out of the contents being executed.

* * * * *